United States Patent [19]

Nespor

[11] 4,322,106
[45] Mar. 30, 1982

[54] PUSH BUMPER FOR TOW TRUCKS

[76] Inventor: Ronald R. Nespor, c/o Chevron, Inc., R.D. #7, Rte. 62, Mercer, Pa. 16137

[21] Appl. No.: 916,491

[22] Filed: Jun. 19, 1978

[51] Int. Cl.² .............................................. B60R 21/14
[52] U.S. Cl. .................................... 296/121; D12/171
[58] Field of Search ............... 293/102, 115, 120, 124, 293/121, 144, 122, 123; D12/171

[56] References Cited

U.S. PATENT DOCUMENTS

| | | | |
|---|---|---|---|
| D. 148,729 | 2/1948 | Sterkel | D12/171 |
| D. 182,108 | 2/1958 | Faulhaber | D12/171 |
| D. 182,408 | 4/1958 | Faulhaber | D12/171 |
| D. 185,142 | 5/1959 | Faulhaber | D12/171 |
| 2,572,477 | 10/1951 | Harjen | 293/102 |
| 2,620,215 | 12/1952 | Luby | 293/102 |
| 2,954,251 | 9/1960 | Barneyi | 293/120 |
| 3,116,083 | 12/1963 | Whitlow | 293/120 |
| 3,419,285 | 12/1968 | Morehouse et al. | 280/448 |
| 3,427,062 | 2/1969 | Struben | 293/117 |
| 3,427,063 | 2/1969 | Taylor | 293/124 |
| 3,431,005 | 3/1969 | Priefert | 293/144 |
| 3,790,200 | 2/1974 | Kalitta | 293/120 |
| 3,901,543 | 8/1975 | Norlin | 293/121 |
| 4,018,466 | 4/1977 | Norlin | 293/122 |
| 4,039,215 | 8/1977 | Minhinnick | 293/121 |

Primary Examiner—Richard A. Bertsch
Attorney, Agent, or Firm—Schuyler, Birch, McKie & Beckett

[57] ABSTRACT

A push bumper for tow trucks comprising a rigid frame defining a flat center portion and rearwardly canted end portions with a front plate secured over the face of the frame and a back plate secured to the rear of the frame. The back plate is provided with upper and lower flanges which are matingly received within the front plate and frame assembly and with end flanges which project forward into supporting engagement with the canted end portions of the front plate and frame assembly. Channel iron internal reinforcing members are disposed between the front and back plates and a headlamp and grill protector is provided at the top of the bumper. Back end plates are also provided to close off the space between the ends of the back plate and the extremities of the canted end portions to provide a sealed structure free of openings through which corrosive materials might enter the interior of the bumper.

19 Claims, 5 Drawing Figures

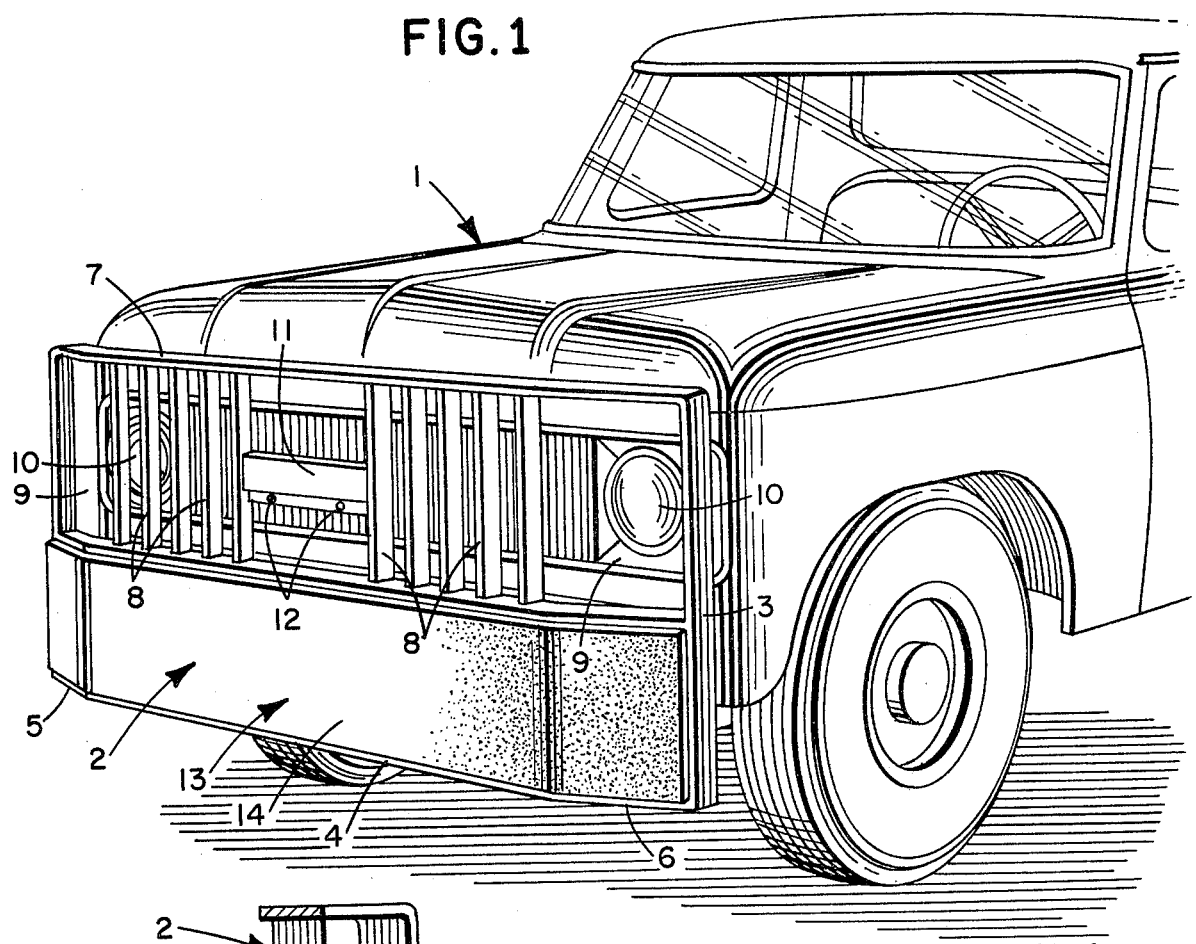

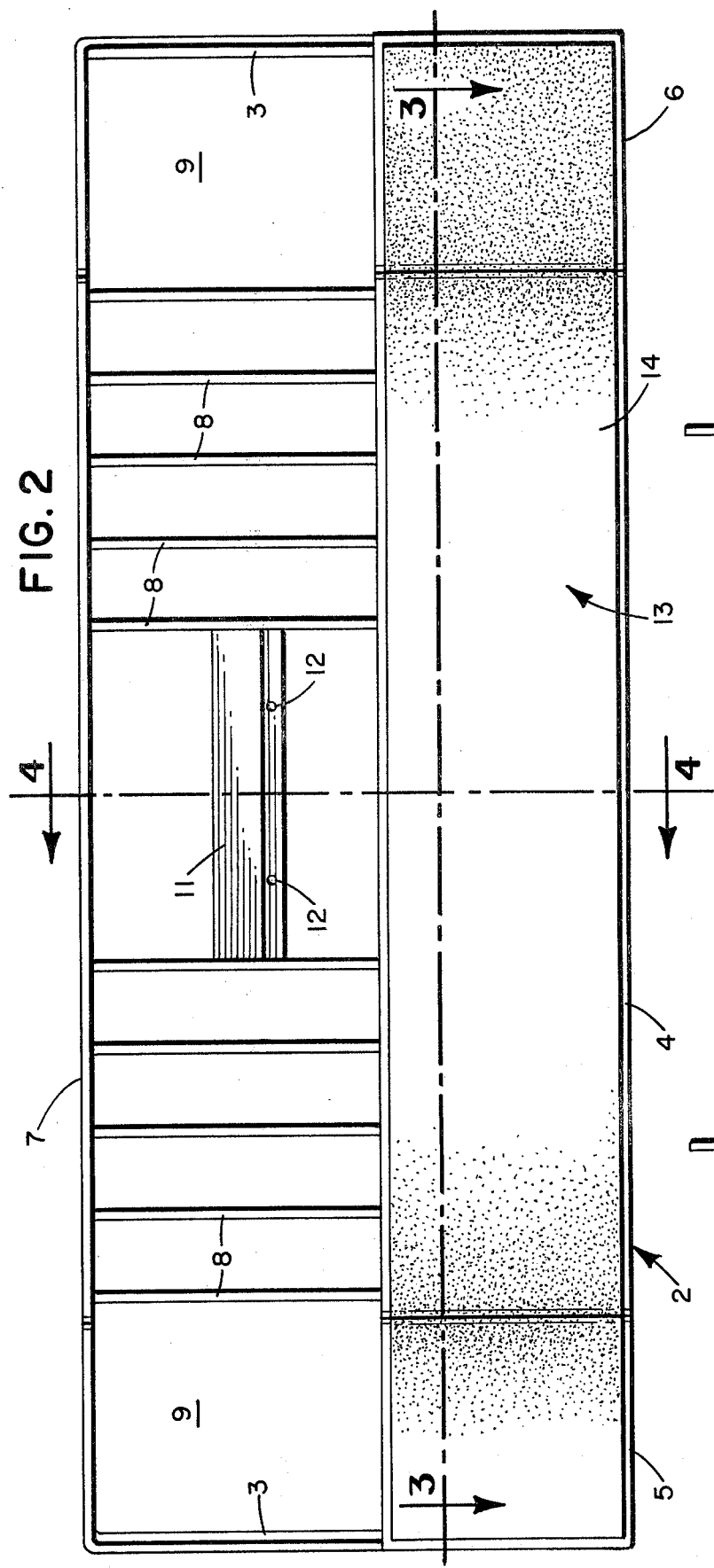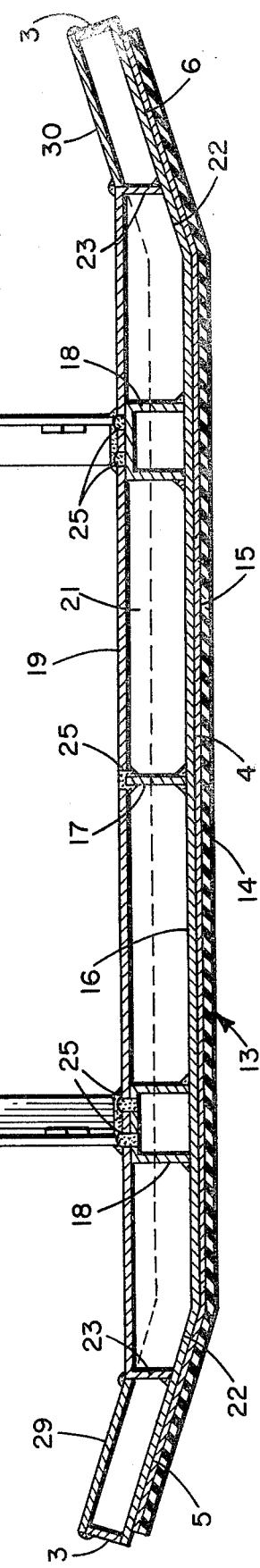

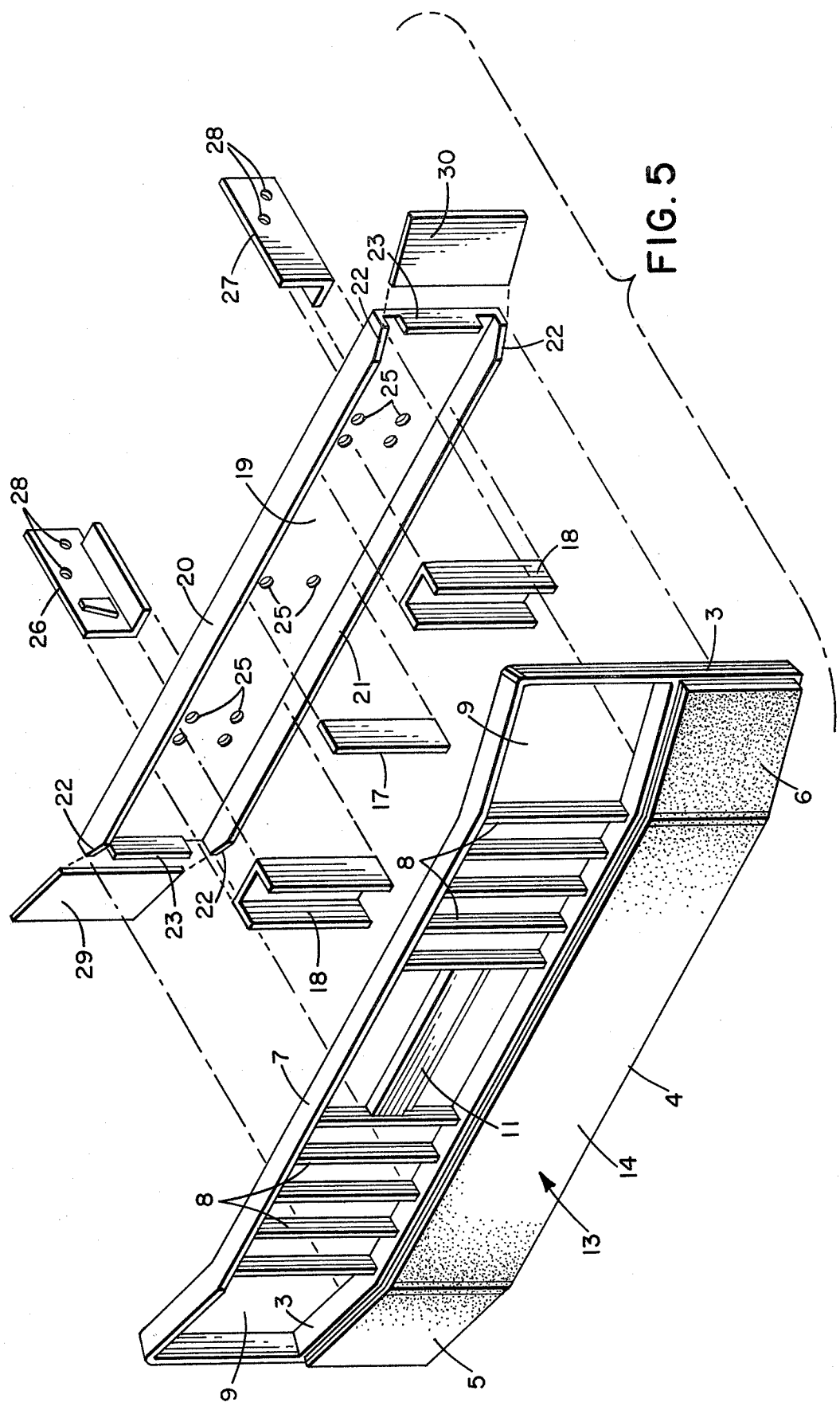

PUSH BUMPER FOR TOW TRUCKS

BACKGROUND OF THE INVENTION

Tow trucks are commonly provided with bumpers to be used for pushing disabled vehicles. The strength of such bumpers is an important consideration. A countervailing consideration is the weight of the bumper. It is important to obtain maximum strength without making the bumper excessively heavy.

Particular problems can arise when the load to be pushed is not centered on the bumper. Frequently, prior art bumpers not sufficiently rigid to withstand the stress of a load concentrated at either end of the bumper without twisting or otherwise sustaining damage.

Prior art bumpers also commonly contain internal recesses or crevices in which corrosive materials such as salt or moisture collect, thereby hastening rusting of the bumper.

Internal reinforcing members have been utilized in prior art bumpers, but such support members often have been inadequately secured to the remainder of the structure.

OBJECTS OF THE INVENTION

It is an object of the present invention to provide a push bumper for tow trucks which is stronger and more rigid than prior art bumpers of corresponding size and weight.

Another object of the present invention is to provide a push bumper for tow trucks which is a sealed unit, free of openings through which corrosive materials might enter the interior of the bumper.

A further object of the invention is to provide a push bumper for tow trucks in which internal reinforcing members are firmly secured to both the front and back plates of the bumper.

A further object of the invention is to provide a push bumper for tow trucks having rearwardly canted end portions which are specially supported to enable the bumper to absorb a load at either end without twisting or otherwise sustaining damage.

Yet another object of the present invention is to provide a push bumper incorporating means for protecting the headlamps and grill of the tow truck.

SUMMARY OF THE INVENTION

These and other objects of the invention are achieved by providing a push bumper for a tow truck comprising frame means defining a flat central portion and rearwardly canted end portions; front plate means secured to the face of said frame means to form a front plate and frame assembly; back plate means secured to the rear of said frame means; said back plate means bearing upper and lower flange means which engage the front plate and frame assembly; said back plate means further comprising right and left flange means which project forward into supporting engagement with the canted end portions of the front plate end frame assembly; and mounting means secured to the rear of said back plate means for attaching the bumper to a vehicle.

In a preferred form of the invention, channel stock reinforcing members are first welded directly to the front plate and subsequently welded to the assembled back plate through holes extending through the back plate. The back plate is intermediate in length between the length of the flat center portion and the overall length of the combined center and canted end portions. The upper and lower flanges on the back plate extend the entire length thereof, and the outermost corners of the flanges are beveled to mate with the canted end portions of the front plate and frame assembly. End flanges formed on the back plate supportingly engage the approximate centers of the canted end portions. Back end plates are provided to close off the space between the ends of the back plate and the ends of the bumper in order to make a sealed unit in which there are no openings through which corrosive materials such as salt or moisture can enter the interior of the bumper. A headlamp and grill protector is formed integrally with the frame means.

BRIEF DESCRIPTION OF THE DRAWINGS

The invention will be described in greater detail with reference to the accompanying drawings wherein:

FIG. 1 is a perspective view of the bumper of the invention mounted on a tow truck vehicle.

FIG. 2 is a front elevation of the bumper of the invention.

FIG. 3 is a top section of the bumper of the invention taken along line 3—3 of FIG. 2.

FIG. 4 is a sectional elevation of the bumper of the invention taken along line 4—4 of FIG. 2.

FIG. 5 is an exploded perspective view of the bumper of the invention.

DETAILED DESCRIPTION OF THE PREFERRED EMBODIMENT

FIG. 1 illustrates a tow truck generally designated by reference numeral 1 bearing the improved push bumper 2 of the present invention. References herein to the forward direction refer to the general direction in which a truck upon which the bumper is mounted will ordinarily be driven. References to the right and left direction refer to these directions as viewed by a person driving a truck upon which the bumper is mounted.

As shown in FIGS. 1 and 2, push bumper 2 comprises a rigid frame member 3 which defines a flat center portion 4 and rearwardly canted right and left end portions 5 and 6 respectively. End portions 5 and 6 preferably angle back between 12 and 25 degrees, most preferably between about 17 and 20 degrees. The upper portion of bumper 2 comprises a grill and headlamp protecting framework 7 which preferably is preformed as an integral part of frame means 3. Vertical bars 8 secured between the bumper 2 proper and the outer frame of headlamp protector 7 act to block protruding portions of other vehicles and other objects from damaging the grill or lights of truck 1. Open areas 9 are provided in front of each of the truck headlamps 10 so that light proceeding from the headlamps will not be obscured. Desirably, a recessed bracket member 11 is provided to which a vehicle license plate may be secured by means of bolts extending through apertures 12.

To prevent damage to vehicles engaged by the bumper, the forward face of bumper 2 (including both flat central portion 4 and canted end portions 5 and 6) is covered with a piece of resilient material 13 which comprises a one-quarter inch layer of rubber 14 secured to a one-sixteenth inch steel plate 15, best seen in FIGS. 3 and 4. A suitable resilient covering is marketed by Goodyear Tire and Rubber Company under the trademark ARMAPLATE. In the illustrated embodiment, the metal reinforced resilient rubber covering is attached to the front plate 16 which in turn is secured to the face of frame 3.

FIGS. 3, 4, and 5 show how internal reinforcing members are incorporated into the bumper. In illustrated embodiment, the internal reinforcing members are of two types; a centrally located, vertically oriented flat plate 17 and vertically oriented U-shaped channel members 18 which are aligned with the mounting means 26 and 27 which serve to attach the bumper to the vehicle frame. Internal reinforcing members 17 and 18 are welded directly to the rear side of the front plate 16. Back plate 19 is then assembled to the front plate frame and internal reinforcing members.

Back plate 19 is provided with forwardly projecting upper and lower flange means 20 and 21 respectively, which are configured to be matingly received within frame means 3. Upper flange means 20 and lower flange means 21 engage face plate 16 and serve to maintain back plate 19 in spaced relation thereto with the inside face of the back plate just contacting internal reinforcing members 17 and 18. Flange members 20 and 21 are preferably formed by appropriate bending of the upper and lower margins of back plate 19. The bent edges between back plate 19 and flanges 20 and 21 contribute greatly to the rigidity of the assembly.

The overall length of back plate 19 is greater than the length of the center portion 4 of the front plate and frame assembly but less than the combined length of the center portion and canted end portions 5 and 6. For example, if the flat center portion of the front plate and frame assembly is 54 inches in length and each of the canted end portions is approximately 12 inches in length, then the length of the back plate may suitably be about 66 inches. In order that upper and lower flanges 20 and 21 will properly mate with the canted end portions of the front plate and frame assembly, the outer most corners of the upper and lower flange members are appropriately beveled as shown at 22.

Back plate 19 is also provided with right and left end flanges 23 and 24 respectively which project forward into supporting engagement with front plate 16 near the centers of rearwardly canted end portions 5 and 6, thereby substantially reinforcing the canted end portions of the bumper. Upper and lower back plate flanges 20 and 21 are somewhat deeper than frame 3 so that the back plate 19 is positioned slightly behind the frame with upper and lower flanges 20 and 21 and end flanges 23 and 24 matingly received within frame 3 and engaging front plate 16. It will be appreciated that the configuration of back plate 19 materially reinforces and strengthens the front plate and frame assembly. Back plate 19 is secured to internal reinforcing members 17 and 18 by welding through a plurality of small holes 25 which extend through the back plate adjacent the reinforcing members. Holes ½ inch to 1 inch in diameter are generally suitable, although smaller or larger holes may also be satisfactory.

Right and left mounting means 26 and 27 respectively, are secured to the rear of back plate 19 in general alignment with internal reinforcing members 18. In the illustrated embodiment, the mounting means comprise pieces of 5 inch by 5 inch angle stock approximately ¼ inch thick. Mounting members 26 and 27 are adapted to extend underneath the front end of a motor vehicle upon which the bumper is to be mounted and to be secured to the underlying frame of the vehicle, for example, by means of bolts extending through holes 28.

Right and left back end plates 29 and 30 respectively, are provided to close off the spaces between the ends of back plate 19 and the extremities of canted end portions 5 and 6. Not only do plates 29 and 30 serve to reinforce the front plate and frame assembly, but they also completely seal off the bumper so that corrosive materials such as salt and moisture cannot enter the interior of the bumper where buildups of such material could foster detrimental corrosion.

The unique construction of the bumper of the present invention makes it possible to provide great strength and rigidity with ordinary weight materials. For example, an outstanding bumper for substantially all tow truck uses can be formed utilizing 5/16 by 2¼ inch steel bar stock for the frame means with 3/16 inch steel stock being used for the front plate and channel reinforcing members. The back plate, flat reinforcing member and back end plates may be formed of approximately ⅛ inch thick steel plate. The supporting angle members utilized to attach the bumper to the tow truck vehicle frame are suitably formed from quarter inch thick angle steel. Preferably, all parts of the bumper are secured to each other by welding, although other means may be utilized.

The foregoing description has been set forth only as an example of the invention and should not be construed as limiting. Since modifications of the described embodiment will undoubtedly occur to persons skilled in the art, the scope of the invention is to be limited solely by the scope of the appended claims.

I claim:

1. A vehicle bumper comprising:
    frame means defining a flat central portion and rearwardly canted end portions;
    front plate means secured to the face of said frame means to form a front plate and frame assembly;
    back plate means secured to the rear of said frame means; said back plate means bearing upper and lower flange means which engage the front plate and frame assembly and maintain the back plate means in spaced relation thereto; said back plate means further comprising right and left flange means which project forwardly into supporting engagement with the canted end portions of said front plate and frame assembly; and
    mounting means secured to the rear of said back plate means for attaching the bumper to a vehicle.

2. A bumper is recited in claim 1 wherein said back plate means is longer than the central portion of said frame means but shorter than the combined length of the central portion and canted end portions of said frame means.

3. A bumper as recited in claim 2 wherein said end flange means supportingly engage the canted end portions of said front plate and frame assembly substantially in the center of said end portions.

4. A bumper as recited in claim 2 wherein the outermost corners of the upper and lower flange means are beveled to mate with the canted end portions of the front plate and frame assembly.

5. A bumper as recited in claim 1 wherein said upper flange member comprises a single, integral forwardly projecting flange formed along the upper margin of said back plate means and extending substantially the entire length of said back plate means.

6. A bumper as recited in claim 1 wherein said lower flange means comprises a single, integral forwardly projecting flange formed along the lower margin of said back plate means extending substantially the entire length of said back plate means.

7. A bumper as recited in claim 1 wherein the upper and lower flange means are matingly received within said frame means.

8. A bumper as recited in claim 1 further comprising internal reinforcing means disposed between the front plate and frame assembly and the back plate means.

9. A bumper as recited in claim 8 wherein said internal reinforcing means comprises at least one vertically oriented member.

10. A bumper as recited in claim 8 wherein said internal reinforcing means comprises at least one U-shaped channel member welded to the front plate means and to the back plate means.

11. A bumper as recited in claim 10 wherein said reinforcing means are welded to said back plate means through small holes formed through the back plate means adjacent said reinforcing means.

12. A bumper as recited in claim 10 wherein said internal reinforcing means are aligned with said means for attaching the bumper to a vehicle.

13. A bumper as recited in claim 1 further comprising a headlamp and grill protecting framework.

14. A bumper as recited in claim 13 wherein said headlamp and grill protecting framework is formed integrally with said frame means.

15. A bumper as recited in claim 13 wherein said headlamp protecting framework includes a recessed license plate mounting bracket.

16. A bumper as recited in claim 1 further comprising end back plates secured to the rear of said front plate and frame assembly between the ends of the back plate means and the extremities of the canted end portions.

17. A bumper as recited in claim 16 wherein said bumper comprises a sealed unit free from openings through which corrosive materials might enter the interior of the bumper.

18. A bumper as recited in claim 1 wherein the parts of the bumper are secured to each other by welding.

19. A bumper as recited in claim 1 wherein said front plate is provided with a resilient covering.

* * * * *